US012673643B2

(12) United States Patent
Kagerer et al.

(10) Patent No.: US 12,673,643 B2
(45) Date of Patent: Jul. 7, 2026

(54) VEHICLE GUIDANCE SYSTEM AND METHOD FOR CONTROLLING AN EMERGENCY STOP ASSISTANCE FUNCTION OF A MOTOR VEHICLE

(71) Applicant: Bayerische Motoren Werke Aktiengesellschaft, Munich (DE)

(72) Inventors: Walter Kagerer, Munich (DE); Sabine Amler, Munich (DE); Sirin Toprak Guerses, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 158 days.

(21) Appl. No.: 18/695,070

(22) PCT Filed: Sep. 12, 2022

(86) PCT No.: PCT/EP2022/075279
§ 371 (c)(1),
(2) Date: Mar. 25, 2024

(87) PCT Pub. No.: WO2023/057171
PCT Pub. Date: Apr. 13, 2023

(65) Prior Publication Data
US 2024/0416875 A1     Dec. 19, 2024

(30) Foreign Application Priority Data
Oct. 6, 2021     (DE) ..................... 10 2021 125 945.2

(51) Int. Cl.
*B60T 7/12*          (2006.01)
*B60T 7/14*          (2006.01)

(52) U.S. Cl.
CPC     *B60T 7/12* (2013.01); *B60T 7/14* (2013.01); *B60T 2210/20* (2013.01);
(Continued)

(58) Field of Classification Search
CPC .......... B60T 7/12; B60T 7/14; B60T 2210/20; B60T 2210/30; B60T 2210/32;
(Continued)

(56) References Cited

U.S. PATENT DOCUMENTS 7,899,616 B2 *  3/2011  Breed .................... G08G 1/161
                                                701/423
2009/0027212 A1  1/2009  Nakagoshi et al.
(Continued)

FOREIGN PATENT DOCUMENTS

AU     2024202759 A1 *  5/2024  ............. G01S 13/88
CA        3033727 C  *  4/2020  ............... B60T 7/18
(Continued)

OTHER PUBLICATIONS

Nidamanuri, et al., "A Progressive Review: Emerging Technologies for ADAS Driven Solutions," in IEEE Transactions on Intelligent Vehicles, vol. 7, No. 2, pp. 326-341, Jun. 2022, doi: 10.1109/TIV. 2021.3122898 (https://ieeexplore.IEEE.org/document/9591277) (Year: 2022).*

(Continued)

*Primary Examiner* — Atul Trivedi
(74) *Attorney, Agent, or Firm* — Crowell & Moring LLP

(57)     ABSTRACT

A vehicle guidance system for a motor vehicle is configured to determine a complexity indicator in relation to the complexity of a driving situation of the motor vehicle and to determine one or more trigger conditions as a function of the complexity indicator. The vehicle guidance system is further configured to cause an automated emergency stop of the motor vehicle if one or more trigger conditions occur.

17 Claims, 1 Drawing Sheet

(52) U.S. Cl.
CPC ....... *B60T 2210/30* (2013.01); *B60T 2210/32* (2013.01); *B60T 2220/00* (2013.01); *B60T 2220/04* (2013.01); *B60T 2250/00* (2013.01); *B60T 2250/04* (2013.01)

(58) Field of Classification Search
CPC ............. B60T 2200/00; B60T 2200/04; B60T 2250/00; B60T 2250/04; B60W 2520/10; B60W 2540/12; B60W 2540/223; B60W 2540/225; B60W 2552/05; B60W 2554/406; B60W 2556/50; B60K 28/02
USPC .......................................................... 701/23
See application file for complete search history.

(56) References Cited

U.S. PATENT DOCUMENTS

| | | | |
|---|---|---|---|
| 2015/0375757 A1 | 12/2015 | Schiek et al. | |
| 2016/0221575 A1* | 8/2016 | Posch | B60W 30/12 |
| 2017/0293299 A1 | 10/2017 | Matsushita et al. | |
| 2018/0127001 A1* | 5/2018 | Ricci | B60W 30/14 |
| 2018/0173975 A1 | 6/2018 | Adibi et al. | |
| 2020/0019801 A1* | 1/2020 | Krishnan | G06V 20/597 |
| 2020/0064833 A1 | 2/2020 | Fox et al. | |
| 2020/0189581 A1 | 6/2020 | Yang et al. | |
| 2020/0201356 A1* | 6/2020 | Schuh | B60W 30/165 |
| 2020/0247431 A1* | 8/2020 | Ferencz | G05D 1/0088 |
| 2020/0286310 A1* | 9/2020 | Carver | G07C 5/0816 |
| 2020/0391760 A1 | 12/2020 | Reschke et al. | |
| 2021/0088784 A1* | 3/2021 | Whitmire | G02B 27/017 |
| 2021/0181837 A1* | 6/2021 | Jiang | G06F 3/013 |
| 2021/0182625 A1* | 6/2021 | Arar | G06N 3/08 |
| 2021/0197807 A1* | 7/2021 | Park | B60W 40/105 |
| 2021/0245775 A1* | 8/2021 | Subramanian | B60W 50/14 |
| 2021/0300306 A1* | 9/2021 | Costin | B60T 7/22 |
| 2021/0316738 A1* | 10/2021 | Iwase | G01C 21/3833 |
| 2022/0034678 A1* | 2/2022 | Chintakindi | G01C 21/3484 |
| 2022/0170752 A1* | 6/2022 | Beaurepaire | B60W 50/0205 |
| 2022/0289198 A1* | 9/2022 | Schmitt | B60T 7/22 |
| 2022/0309521 A1* | 9/2022 | Stenneth | G06N 5/022 |
| 2023/0176577 A1* | 6/2023 | Ditty | B60W 60/0015 |
| | | | 701/23 |

| | | | |
|---|---|---|---|
| 2024/0140417 A1* | 5/2024 | Kume | B60W 50/08 |
| 2024/0317241 A1* | 9/2024 | Ljungström | B60Q 9/00 |
| 2025/0018935 A1* | 1/2025 | Münning | B60W 30/08 |
| 2025/0026361 A1* | 1/2025 | Mahadevan | B60K 35/21 |
| 2025/0091609 A1* | 3/2025 | Mahadevan | B60W 50/14 |
| 2025/0145162 A1* | 5/2025 | Kuwahara | B60W 40/09 |
| 2025/0145168 A1* | 5/2025 | Kuwahara | B60W 50/10 |

FOREIGN PATENT DOCUMENTS

| | | | | |
|---|---|---|---|---|
| DE | 10 2014 212 596 A1 | 12/2015 | | |
| DE | 10 2017 211 005 A1 | 6/2018 | | |
| DE | 10 2018 222 176 A1 | 6/2020 | | |
| DE | 10 2019 114 206 A1 | 12/2020 | | |
| DE | 10 2019 208 663 A1 | 12/2020 | | |
| DE | 102023120743 A1 * | 2/2025 | ....... | G08G 1/096725 |
| EP | 3616965 B1 * | 4/2021 | ........... | B60W 40/09 |
| EP | 4406800 A1 * | 7/2024 | ...... | B60W 30/18163 |
| WO | WO-2020165650 A2 * | 8/2020 | ........... | G06V 20/588 |
| WO | WO-2020165824 A1 * | 8/2020 | .............. | G08G 1/22 |
| WO | WO-2023002797 A1 * | 1/2023 | ...... | B60W 30/18163 |

OTHER PUBLICATIONS

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (2 pages).

"(R) Taxonomy and Definitions for Terms Related to Driving Automation Systems for On-Road Motor Vehicles", Surface Vehicle Recommended Practice, SAE (Society of Automotive Engineering) International, J3016™M, Sep. 2016, pp. 1-30 (30 pages).

International Search Report (PCT/ISA/210) issued in PCT Application No. PCT/EP2022/075279 dated Jan. 30, 2023 with English translation (5 pages).

German-language Written Opinion (PCT/ISA/237) issued in PCT Application No. PCT/EP2022/075279 dated Jan. 30, 2023 with English translation (10 pages).

German-language Search Report issued in German Application No. 10 2021 125 945.2 dated Mar. 29, 2022 with partial English translation (11 pages).

* cited by examiner

VEHICLE GUIDANCE SYSTEM AND METHOD FOR CONTROLLING AN EMERGENCY STOP ASSISTANCE FUNCTION OF A MOTOR VEHICLE

BACKGROUND AND SUMMARY

The invention relates to a vehicle guidance system and to a corresponding method for controlling an emergency-stop assistance function of a motor vehicle.

A vehicle may include one or more driving functions—in particular, driver-assistance functions—which have been designed to assist the driver of the vehicle in connection with the longitudinal and/or lateral guidance of the vehicle. The vehicle may include, in particular, an emergency-stop assistance function which has been designed to bring about an emergency stop of the vehicle if it is detected that the driver has closed his/her eyes or has lowered his/her head for a relatively long period of time (of 3 seconds, for example). On the basis of such triggering conditions of the emergency-stop assistance function, it is to be ensured that the vehicle can be brought to a standstill if the driver is no longer capable of guiding the vehicle manually (for example, because the driver has fallen asleep).

Automatically bringing about an emergency stop may be uncomfortable and annoying for the driver of the vehicle if the driver continues to be capable of guiding the vehicle manually. Furthermore, an emergency stop usually results in a disturbance of the traffic in the vicinity of the vehicle, so unnecessary emergency stops should be avoided.

The present document is concerned with the technical object of enhancing the comfort and reliability of an emergency-stop assistance function.

The object is achieved by each of the independent claims. Advantageous embodiments are described at least in the dependent claims. Attention is drawn to the fact that additional features of a patent claim that is dependent on an independent patent claim, without the features of the independent patent claim or only in combination with a subset of the features of the independent patent claim, may constitute a separate invention which is independent of the combination of all the features of the independent patent claim and which may be made the subject of an independent claim, of a division application, or of a subsequent application. This holds equally for technical teachings described in the description, which may constitute an invention which is independent of the features of the independent patent claims.

According to one aspect, a vehicle guidance system for a motor vehicle is described. The vehicle guidance system has been configured to bring about an automated emergency stop of the motor vehicle when one or more triggering conditions occur. The one or more triggering conditions may be focused on the condition and/or on the behavior of the driver of the vehicle (with respect to the implementation of the driving task). Within the scope of the automated emergency stop, the vehicle can be guided longitudinally and, where appropriate, laterally in an automated manner, in order to bring the vehicle to a standstill.

The one or more triggering conditions may have at least one triggering period. The triggering period may depend on a (maximally permissible) period of time for the existence of a particular driver-related behavior and/or condition. In particular, the triggering period may correspond to such a (maximally permissible) period of time. Exemplary driver-related behaviors and/or conditions are: the driver has closed his/her eyes; the driver's head is deviating from the straight-ahead position (for example, because the head is still inclined forward or rearward). The vehicle guidance system may have been designed to bring about the automated emergency stop of the motor vehicle after the triggering period has elapsed (in particular, after the maximally permissible period of time for the behavior and/or the condition of the driver has elapsed). The triggering period may be the (maximally permissible) period of time for which the driver may (at most) be inattentive (for example, for which the driver may close his/her eyes and/or avert his/her head from the straight-ahead position) before the automated emergency stop of the motor vehicle is brought about.

In particular, the one or more triggering conditions may include a first triggering condition, to the effect that the driver of the vehicle has closed his/her eyes continuously for at least a first triggering period. Alternatively or additionally, the one or more triggering conditions may include a second triggering condition, to the effect that the driver's head is oriented away from a straight-ahead position—in particular, down, up and/or to the side—for at least a second triggering period. The automated emergency stop can, for example, be triggered as soon as at least one of the triggering conditions has been satisfied.

The vehicle guidance system may be configured to ascertain driver data with respect to the driver of the vehicle—in particular, to ascertain image data pertaining to a camera directed toward the driver. On the basis of the driver data, it can then be determined whether or not one or more triggering conditions for the triggering of an automated emergency stop of the vehicle have been satisfied. Furthermore, an automated emergency stop of the vehicle can be brought about when (where appropriate, only when) it has been determined or it is determined that one or more triggering conditions have been satisfied.

The one or more triggering conditions can be checked repeatedly, in particular periodically (for example, at a frequency of 0.5 Hz or more). During a journey of the vehicle it can consequently be repeatedly checked whether or not an automated emergency stop will be brought about.

The vehicle guidance system has furthermore been configured to ascertain a complexity indicator with respect to the complexity of a driving situation of the motor vehicle. The complexity indicator can indicate how complex the driving situation typically is for a driver, and/or what degree of attentiveness the driving situation typically requires from a driver.

The vehicle guidance system may be configured to ascertain the complexity indicator with respect to the complexity of the driving situation on the basis of ambient-field data from one or more ambient-field sensors (for example, from an ambient-field camera) of the motor vehicle. Alternatively or additionally, the complexity indicator can be ascertained on the basis of map data for a digital map with respect to the road network being driven along by the motor vehicle. Alternatively or additionally, the complexity indicator can be ascertained on the basis of condition data with respect to the condition, in particular with respect to the driving speed and/or with respect to one or more activated driver-assistance functions, of the vehicle.

The complexity indicator can, for example, be ascertained on the basis of one or more of the following items of information:

- an item of information with respect to the driving speed of the vehicle (on the basis of the condition data);
- an item of information with respect to the traffic density of traffic in the ambient field of the vehicle (on the basis of the ambient-field data);

an item of information with respect to the type of the roadway being driven along by the vehicle (on the basis of the map data);

an item of information with respect to one or more activated driver-assistance functions (on the basis of the condition data); and/or an item of information with respect to the existence of a traffic-jam journey of the vehicle (on the basis of the ambient-field data).

The vehicle guidance system may consequently be configured to ascertain (repeatedly, in particular periodically) how complex the driving situation of the vehicle is in the given case. This can be indicated by the complexity indicator. The complexity indicator can, for example, indicate a complexity category of the driving situation obtaining in the given case.

The vehicle guidance system has furthermore been configured to determine, in particular to adapt, the one or more triggering conditions (for triggering the automated emergency stop) as a function of the complexity indicator. The vehicle guidance system may, in particular, have been configured to determine, in particular to adapt, the at least one triggering period as a function of the complexity indicator. The adaptation can be undertaken in such a manner that the triggering period increases if the complexity of the driving situation indicated by the complexity indicator diminishes. Alternatively or additionally, the adaptation can be undertaken in such a manner that the triggering period diminishes if the complexity of the driving situation indicated by the complexity indicator increases.

In particular, the vehicle guidance system may be configured to determine, in particular to adapt, the one or more triggering conditions (or the one or more triggering periods) as a function of the complexity indicator in such a manner that the probability that an automated emergency stop of the motor vehicle will be brought about diminishes if the complexity of the driving situation indicated by the complexity indicator diminishes, and/or that the probability that an automated emergency stop of the motor vehicle will be brought about increases if the complexity of the driving situation indicated by the complexity indicator increases.

As already stated above, the vehicle guidance system has furthermore been configured to bring about the automated emergency stop of the motor vehicle when the one or more triggering conditions obtain.

A vehicle guidance system is consequently described that has been designed to adapt the one or more triggering conditions for triggering the automated emergency stop (repeatedly, in particular periodically) to the complexity of the driving situation obtaining in the given case. In this way, the comfort and reliability of an emergency-stop assistance function can be enhanced. In particular, in this way unnecessary emergency stops can be avoided in reliable and safe manner.

The vehicle guidance system may be configured to ascertain, on the basis of the complexity indicator, whether a driving situation pertaining to a first (complexity) category or to a second (complexity) category obtains. Driving situations pertaining to the first category and to the second category may each exhibit differing complexities (that is to say, may each be perceived by typical drivers as being variably complex).

One or more first triggering conditions for the triggering of an automated emergency stop of the vehicle can be used when a driving situation pertaining to the first category obtains, and one or more second triggering conditions for the triggering of an automated emergency stop of the vehicle can be used if a driving situation pertaining to the second category obtains. The one or more second triggering conditions may differ at least partially from the one or more first triggering conditions.

By virtue of the categorization of the differing driving situations, the comfort and reliability of the emergency-stop assistance function can be enhanced in particularly efficient manner.

The vehicle guidance system may be configured to detect one or more indications of activity with respect to the activity of the driver of the vehicle. The one or more indications of activity may, for example, include an actuation of a control element—such as a button, the gas pedal and/or the brake pedal—of the vehicle by the driver. If an indication of activity is detected (at a particular time), this indicates that the driver may still be capable of driving (for example, for a particular period starting from the particular time). The one or more triggering conditions can then be adapted also as a function of the one or more detected indications of activity (for the particular period starting from the particular time). The adaptation can be undertaken in such a manner that the one or more triggering periods are extended if an indication of activity has been detected. In this way, the comfort and reliability of the emergency-stop assistance function can be enhanced further.

According to a further aspect, a (road) motor vehicle (in particular, a passenger car or a truck or a bus) is described that includes the vehicle guidance system described in this document.

According to a further aspect, a method for controlling an emergency-stop assistance function of a motor vehicle is described that has been configured to bring about an automated emergency stop when one or more triggering conditions obtain. The method includes the ascertaining of a complexity indicator with respect to the complexity of a driving situation of the motor vehicle (with respect to the driving task to be performed by the driver). Moreover, the method includes the determining, in particular the adapting, of the one or more triggering conditions as a function of the complexity indicator.

According to a further aspect, a software (SW) program is described. The SW program may have been configured to be executed in a processor (for example, in a control unit of a vehicle) and thereby to execute the method described in this document.

According to a further aspect, a storage medium is described. The storage medium may include a SW program that has been configured to be executed in a processor and thereby to execute the method described in this document.

Within the scope of this document, the term "automated driving" may be understood to mean driving with automated longitudinal guidance or lateral guidance, or autonomous driving with automated longitudinal guidance and lateral guidance. In the case of automated driving, it may be a question, for instance, of driving on the freeway for a relatively long time, or of temporally limited driving within the scope of parking or maneuvering. The term "automated driving" encompasses automated driving with any degree of automation. Exemplary degrees of automation are assisted, partially automated, highly automated or fully automated driving. These degrees of automation were defined by the Bundesanstalt für Straßenwesen (BASt) [German Federal Highway Research Institute] (see BASt publication entitled "Forschung kompakt", issue November 2012). In the case of assisted driving, the driver executes the longitudinal guidance or lateral guidance permanently, while the system takes over the respective other function within certain limits. In the case of partially automated driving), the system takes over the longitudinal guidance and lateral guidance for a certain period of time and/or in specific situations, in the course of which the driver has to monitor the system permanently, as in the case of assisted driving. In the case of highly automated driving, the system takes over the longitudinal guidance and lateral guidance for a certain period of time, without the driver having to monitor the system permanently; but the driver has to be capable of taking over the guidance of the vehicle within a certain time. In the case of fully automated driving, the system can manage the driving automatically in all situations for a specific application; a driver is no longer required for this application. The aforementioned four degrees of automation correspond to SAE Levels 1 to 4 of the SAE J3016 standard (SAE—Society of Automotive Engineering). For instance, highly automated driving corresponds to Level 3 of the SAE J3016 standard. Furthermore, SAE Level 5 is also provided in SAE J3016 as the highest degree of automation, which is not included in the definition given by the BASt. SAE Level 5 corresponds to driverless driving, in the course of which the system can manage all situations automatically during the entire journey like a human driver; a driver is generally no longer required. The aspects described in this document relate, in particular, to driving functions according to SAE Level 1 or 2.

It is to be borne in mind that the methods, devices and systems described in this document can be used both on their own and in combination with other methods, devices and systems described in this document. Moreover, any aspects of the methods, devices and systems described in this document can be combined with one another in many different ways. In particular, the features of the claims can be combined with one another in many different ways. Furthermore, features listed in brackets are to be understood as being optional features.

The invention will be described in more detail in the following with reference to exemplary embodiments.

DETAILED DESCRIPTION OF THE DRAWINGS

Figure 1:
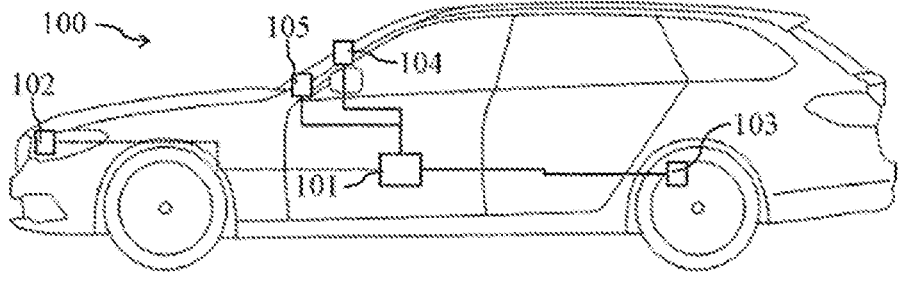
FIG. 1 shows an exemplary vehicle with an emergency-stop assistance function.

As stated at the beginning, the present document is concerned with the enhancement of the comfort and reliability of an emergency-stop assistance function. In this context, FIG. 1 shows an exemplary vehicle 100 which includes one or more ambient-field sensors 102 which have been configured to capture ambient-field data (that is to say, sensor data) with respect to the ambient field of the vehicle 100 (in particular, with respect to the ambient field in the direction of travel ahead of the vehicle 100). Exemplary ambient-field sensors 102 are one or more cameras, one or more radar sensors, one or more lidar sensors, one or more ultrasonic sensors, etc.

A control unit 101 of the vehicle 100 has been configured to evaluate the ambient-field data, in order to provide one or more driving functions of the vehicle 100. Exemplary driving functions are a lane-keeping assistance function, an adaptive spacing regulator and/or speed regulator, an emergency-stop assistance function, etc. For this purpose, one or more longitudinal-guidance and/or lateral-guidance actuators 103 of the vehicle 100 (for example, a drive motor, a steering device and/or a braking device) can be activated by the control unit 101.

Within the scope of the emergency-stop assistance function, it can be ensured that the vehicle 100 will be decelerated to a standstill in an automated manner within the lane currently being driven along. The longitudinal guidance and the lateral guidance of the vehicle 100 can be brought about in an automated manner by the vehicle 100, in particular by the control unit 101.

The vehicle 100 includes one or more driver sensors 104 which have been configured to capture driver data (that is to say, sensor data) with respect to the driver of the vehicle 100. The one or more driver sensors 104 may include, in particular, a camera directed from the front toward the driver, for instance toward the driver's head. The control unit 101 may be configured to evaluate the driver data, in order, for example, to ascertain:

whether the driver's eyes are open or closed;

whether the driver's head (in relation to the horizontal) has dropped down (that is to say, into the driver's lap) (for example, by 15° or more);

whether the driver's head is turned away to the side; and/or whether the driver's head has dropped rearward (that is to say, against the headrest).

The aforementioned information may be an indication that the attention of the driver of the vehicle 100 is not focused on the driving task or on the monitoring of the driving task brought about by the vehicle 100. Where appropriate, by virtue of the aforementioned information it can be indicated that the driver of the vehicle 100 is not conscious (for example, because the driver is asleep).

The control unit 101—that is to say, a vehicle guidance system including the control unit 101—may be configured to check, on the basis of the driver data, whether or not one or more triggering conditions for triggering an automated emergency stop have been satisfied. Exemplary triggering conditions are:

a first triggering condition, to the effect that the driver's eyes have been closed uninterruptedly for at least a first triggering period (of 3 seconds, for example); and/or a second triggering condition, to the effect that the driver's head has dropped down uninterruptedly for at least a second triggering period (of 3 seconds, for example).

If it is determined that one or more triggering conditions have been satisfied, an automated emergency stop can be triggered, in order to bring the vehicle 100 to a standstill in automated manner within the lane currently being driven along.

As stated at the beginning, an automated emergency stop may result in a disturbance of the traffic in the ambient field of the vehicle 100. Furthermore, the driver may be perturbed or surprised by the emergency stop if the driver is still in a ready-to-drive condition.

The vehicle guidance system may be configured to ascertain, within the scope of the emergency-stop assistance function, a complexity indicator for the complexity of an existing driving situation. The complexity indicator and/or the complexity of a driving situation may, for example, depend on:

the driving speed of the vehicle 100, in which connection the complexity typically increases with increasing driving speed;

the type of road, such as, for example, freeway, country road, town center, in which connection the complexity is typically higher in the town center than on the freeway;

the traffic density of the surrounding traffic, in which connection the complexity typically increases with increasing traffic density;

the driving in a traffic jam, this typically being associated with a relatively low complexity;

an activated driver-assistance function, in particular a driver-assistance function that has been configured to guide the vehicle 100 longitudinally and/or laterally at least partially in an automated manner (such as, for example, a lane-keeping assistance function and/or a spacing regulator and/or speed regulator). The utilization of one or more driver-assistance functions typically leads to a reduction of the complexity of the driving situation.

The driver-assistance system may consequently be configured to ascertain a complexity indicator which indicates how complex the present driving situation is with respect to the driving task to be performed by the driver (for longitudinal and/or lateral guidance of the vehicle 100).

The driver-assistance system may furthermore be configured to adapt one or more triggering conditions for implementing an automated emergency stop as a function of the ascertained complexity indicator for the complexity of the present driving situation. One or more triggering conditions can be adapted in such a manner that:

the probability of the implementation of an automated emergency stop diminishes if the complexity of the driving situation indicated by the complexity indicator diminishes; and/or the probability of the implementation of an automated emergency stop increases if the complexity of the driving situation indicated by the complexity indicator increases.

In particular, the triggering period of the one or more triggering conditions (for the existence of an inattentive driver) can be extended if the complexity of the driving situation indicated by the complexity indicator diminishes. On the other hand, the triggering period of one or more triggering conditions can be shortened if the complexity of the driving situation indicated by the complexity indicator increases.

Exemplary triggering conditions for an emergency stop are, for example (where appropriate, when a driving speed of >70 km/h obtains):

driver's eyes closed for ≥2.5 s (triggering period 1).

dropping of the driver's head forward by ≥20° and maintenance of an angle≥18° for ≥1.5 s (triggering period 2).

dropping of the driver's head forward by ≥15° in ≤0.5 s and no recognition of the driver's face within 1.5 s (triggering period 3).

dropping of the driver's head rearward by ≥10° and maintenance of the angle≥10° for ≥1.5 s (triggering period 4).

The aforementioned triggering periods can be adapted as a function of the complexity indicator for the complexity of the present driving situation. In particular, the triggering periods can be increased if the existence of a driving situation with a relatively low complexity is detected (such as, for example, driving at relatively low speed, for instance between 20 km/h and 50 km/h, in a traffic jam). For instance, triggering period 1 can be increased to 5 s, triggering period 2 can be increased to 3 s, triggering period 3 can be increased to 3 s, and/or triggering period 4 can be increased to 3 s (where "s" stands for seconds).

The driver-assistance system may, where appropriate, be designed to output an (acoustic) request for attentiveness to the driver of the vehicle 100 prior to implementation of an automated emergency stop if, on the basis of the driver data, it is detected that the driver is exhibiting an insufficient degree of attentiveness with respect to the driving task. For instance, the orientation of the driver's head can be ascertained on the basis of the driver data (for example, with reference to the orientation of the driver's nose). If the orientation of the head deviates from the straight-ahead direction for a particular period of time (for example, 3 s), an acoustic request for attentiveness can firstly be output (via a loudspeaker 105 of the vehicle 100). If the orientation of the head continues to deviate from the straight-ahead direction, the automated emergency stop can be brought about after a triggering period. This triggering period can, in turn, be adapted as a function of the complexity indicator.

It can be observed that drivers allow themselves to be distracted to an increased extent in the course of driving tasks that are not very demanding (that is to say, in relatively uncomplicated driving situations), and may intentionally look down (for example, in order to view a mobile user device such as a smartphone). In such a situation, the triggering of an automated emergency stop may occur even though the driver is not actually incapable of driving.

As described in this document, the one or more detection times for the inability of the driver to drive (that is to say, the one or more triggering periods) can be made longer or shorter, depending on the complexity of the traffic scenario. For instance, a category can be defined for a relatively complex traffic scenario in which a journey within a residential area or a journey at relatively high speed (for example >50 km/h) obtains. In a further example, a category can be defined for a relatively uncomplicated traffic scenario in which a traffic-jam journey below 50 km/h obtains.

The recognition of the category—that is to say, the ascertainment of the complexity indicator—can be undertaken via the capture of the ambient field of the vehicle 100 by one or more ambient-field sensors 102 (for example, in order to ascertain the traffic density, the probability of a traffic jam, etc.) and/or via navigation data (for example, in order to ascertain the existence of a residential area via the class of road).

Figure 2:
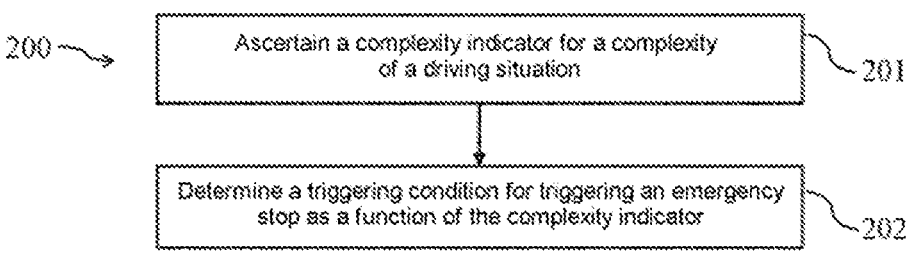
FIG. 2 is a flowchart of an exemplary method for operating an emergency-stop assistance function.

FIG. 2 shows a flowchart of a (where appropriate, computer-implemented) method 200 for controlling an emergency-stop assistance function of a motor vehicle 100. The emergency-stop assistance function has been configured to bring about an automated emergency stop of the motor vehicle 100 when one or more triggering conditions obtain. The one or more triggering conditions may relate to the attentiveness of the driver of the vehicle 100. In particular, a first triggering condition may relate to whether and for how long the driver's eyes have been closed. A second triggering condition may relate to the orientation of the driver's head. Within the scope of the automated emergency stop, it can be ensured that the vehicle 100 is brought to a standstill in automated manner (where appropriate, within the lane currently being driven along).

The method 200 includes the ascertaining 201 of a complexity indicator with respect to the complexity of the driving situation of the motor vehicle 100 currently present in the given case. The complexity indicator can indicate how complex the driving situation currently present in the given case is typically perceived to be by a driver.

Moreover, the method 200 includes the determining, in particular the adapting, 202 of the one or more triggering conditions as a function of the complexity indicator. The complexity indicator and, based thereon, the one or more triggering conditions (with respect to the driving situation present in the given case) can be determined, in particular can be adapted, repeatedly, in particular periodically. In this way, the comfort and reliability of an emergency-stop assistance function can be enhanced.

The present invention is not restricted to the embodiment examples shown. In particular, it should be noted that the description and the figures are intended to illustrate the principle of the proposed methods, devices and systems only in exemplary manner.

What is claimed is:

1. A system for a motor vehicle, the system comprising:
a vehicle guidance system operatively configured to:
  ascertain a complexity indicator with respect to a complexity of a driving situation of the motor vehicle for a driver of the motor vehicle based on an item of information with respect to one or more activated driver-assistance functions of the motor vehicle;
  determine one or more triggering conditions for an automated emergency stop of the motor vehicle as a function of the complexity indicator, the one or more triggering conditions being based on a physical condition and/or behavior of the driver; and
  bring about the automated emergency stop of the motor vehicle when one or more triggering conditions occur.

2. The system according to claim 1, wherein
the one or more triggering conditions have at least one triggering period which depends on a maximally permissible period of time for an existence of a particular driver-related behavior and/or condition; and
the vehicle guidance system is further configured to:
  adapt the at least one triggering period as a function of the complexity indicator, such that:
  (i) the triggering period increases when the complexity of the driving situation indicated by the complexity indicator diminishes; and/or
  (ii) the triggering period diminishes when the complexity of the driving situation indicated by the complexity indicator increases.

3. The system according to claim 2, wherein the one or more triggering conditions comprise:
a first triggering condition, to the effect that a driver of the vehicle has closed his/her eyes continuously for at least a first triggering period; and/or
a second triggering condition, to the effect that a head of the driver is oriented away from a straight-ahead position for at least a second triggering period.

4. The system according to claim 1, wherein
the vehicle guidance system is further configured to:
  ascertain the complexity indicator with respect to the complexity of the driving situation based on ambient-field data from one or more ambient-field sensors of the motor vehicle.

5. The system according to claim 4, wherein
the vehicle guidance system is further configured to:
  ascertain the complexity indicator based on or more of the following items of information:
    an item of information with respect to a traffic density of traffic in an ambient field of the vehicle; and/or an item of information with respect to an existence of a traffic-jam journey of the vehicle.

6. The system according to claim 1, wherein
the vehicle guidance system is further configured to:
  ascertain the complexity indicator with respect to the complexity of the driving situation based on map data for a digital map with respect to a road network being driven along by the motor vehicle.

7. The system according to claim 6, wherein
the vehicle guidance system is further configured to:
  ascertain the complexity indicator based on information with respect to a type of a roadway being driven along by the vehicle.

8. The system according to claim 1, wherein
the vehicle guidance system is further configured to:
  ascertain the complexity indicator with respect to the complexity of the driving situation based on condition data with respect to a condition of the vehicle.

9. The system according to claim 8, wherein
the vehicle guidance system is further configured to:
  ascertain the complexity indicator based on
    an item of information with respect to a driving speed of the vehicle.

10. The system according to claim 1, wherein
the vehicle guidance system is further configured to:
ascertain, based on the complexity indicator, whether a driving situation pertaining to a first category or to a second category occurs, driving situations pertaining to the first category and to the second category each exhibiting a differing complexity;
use one or more first triggering conditions for the triggering of an automated emergency stop of the vehicle when a driving situation pertaining to the first category occurs; and
use one or more second triggering conditions for the triggering of an automated emergency stop of the vehicle when a driving situation pertaining to the second category occurs, the one or more second triggering conditions differing from the one or more first triggering conditions.

11. The system according to claim 1, wherein
the vehicle guidance system is further configured to:
  ascertain driver data with respect to a driver;
  determine, based on the driver data, whether or not the one or more triggering conditions for the triggering of an automated emergency stop of the vehicle have been satisfied; and
  bring about an automated emergency stop of the vehicle when it has been determined that the one or more triggering conditions have been satisfied.

12. The system according to claim 11, wherein the driver data comprises image data of a camera directed toward the driver.

13. The system according to claim 1, wherein
the vehicle guidance system is further configured to:
  detect one or more indications of activity with respect to an activity of a driver of the vehicle, the one or more indications of activity including an actuation of a control element of the vehicle by the driver; and
  adapt the one or more triggering conditions also as a function of the one or more detected indications of activity.

14. The system according to claim 13, wherein the control element is a button, a gas pedal and/or a brake pedal.

15. The system according to claim 1, wherein
the vehicle guidance system is further configured to ascertain a complexity indicator which indicates:

how complex the driving situation is for a driver; and/or what degree of attentiveness the driving situation requires from a driver.

16. The system according to claim 1, wherein the vehicle guidance system is further configured to adapt the one or more triggering conditions as a function of the complexity indicator such that:

a probability that an automated emergency stop of the motor vehicle will be brought about diminishes when the complexity of the driving situation indicated by the complexity indicator diminishes; and/or the probability that an automated emergency stop of the motor vehicle will be brought about increases when the complexity of the driving situation indicated by the complexity indicator increases.

17. A method for controlling an emergency-stop assistance function of a motor vehicle, which has been configured to bring about an automated emergency stop of the motor vehicle when one or more triggering conditions occur, the method comprising:

ascertaining a complexity indicator with respect to a complexity of a driving situation of the motor vehicle for a driver of the motor vehicle based on an item of information with respect to one or more activated driver-assistance functions of the motor vehicle; and determining the one or more triggering conditions as a function of the complexity indicator, the one or more triggering conditions being based on a physical condition and/or behavior of the driver.

\* \* \* \* \*